US008108067B2

(12) United States Patent
Uejo

(10) Patent No.: US 8,108,067 B2
(45) Date of Patent: Jan. 31, 2012

(54) DOCUMENT DISCARDING APPARATUS, DOCUMENT MANAGING SYSTEM, AND COMPUTER READABLE MEDIUM

(75) Inventor: Hiroyoshi Uejo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 351 days.

(21) Appl. No.: 12/402,612

(22) Filed: Mar. 12, 2009

(65) Prior Publication Data

US 2009/0234497 A1 Sep. 17, 2009

(30) Foreign Application Priority Data

Mar. 14, 2008 (JP) ................................ P2008-065573

(51) Int. Cl.
*G06F 7/06* (2006.01)

(52) U.S. Cl. ..... 700/226; 700/225; 700/228; 270/52.02; 270/52.04

(58) Field of Classification Search ............... 270/52.02, 270/52.04; 700/225, 226, 228, 230
See application file for complete search history.

(56) References Cited

U.S. PATENT DOCUMENTS

| | | | | |
|---|---|---|---|---|
| 7,239,117 | B2 * | 7/2007 | Lee et al. | 323/283 |
| 7,734,370 | B2 * | 6/2010 | Sugawara et al. | 700/226 |
| 2007/0176031 | A1 * | 8/2007 | Suzuki et al. | 241/36 |
| 2007/0177218 | A1 * | 8/2007 | Sugawara et al. | 358/296 |
| 2009/0166270 | A1 * | 7/2009 | Sato | 209/576 |

FOREIGN PATENT DOCUMENTS

JP 11-339024 A 12/1999

* cited by examiner

*Primary Examiner* — Leslie A Nicholson, III
(74) *Attorney, Agent, or Firm* — Sughrue Mion, PLLC

(57) ABSTRACT

A document discarding apparatus includes: a metal detector that detects presence or absence of a metal embedded in a document; a code reader that reads a code; an instruction accept portion that accepts an instruction to discard the document; a document discarding portion that discards the document; a first determining unit that, according to the presence or absence of the metal, determines whether the document may be discarded in the document discarding portion; a second determining unit that, according to the code, determines whether the document may be discarded in the document discarding portion; and a document discarding control unit that, when the instruction accept portion accepts an instruction to discard the document, on condition that the first determining unit and the second determining unit both determine that the document can be discarded in the document discarding portion, controls the document discarding portion to discard the document.

4 Claims, 9 Drawing Sheets

FIG. 10

61

| 62 | 63 | 64 | 65 | 66 | 67 |
|---|---|---|---|---|---|
| DOCUMENT ID | GENERATION DATE | AVAILABILITY OF CARRY-OUT | DISCARDABLE DATE | DISCARDING DATE | DISCARDER |
| 00000001 | 1998.5.31 | AVAILABLE | | | |
| 00000002 | 1998.6.3 | NOT AVAILABLE | 2001.6.12 | 2001.7.7 | AAAA |
| ... | ... | ... | ... | ... | ... |
| 00000675 | 2000.1.7 | NOT AVAILABLE | 2005.1.1 | 2005.3.5 | AAAA |
| ... | ... | ... | ... | ... | ... |
| 00001251 | 2002.4.11 | NOT AVAILABLE | 2008.5.1 | | |
| ... | ... | ... | ... | ... | ... |

DOCUMENT DISCARDING APPARATUS, DOCUMENT MANAGING SYSTEM, AND COMPUTER READABLE MEDIUM

CROSS-REFERENCE TO RELATED APPLICATIONS

This application is based on and claims priority under 35 U.S.C. 119 from Japanese Patent Application No. 2008-065573 filed Mar. 14, 2008.

BACKGROUND

Technical Field

The present invention relates to a document discarding apparatus, a document managing system, and a computer readable medium.

SUMMARY

According to an aspect of the present invention, a document discarding apparatus includes: a metal detector that detects presence or absence of a metal embedded in a document recorded on a printing medium; a code reader that reads a code obtained by encoding information and displayed on the document; an instruction accept portion that accepts an instruction to discard the document; a document discarding portion that discards the document; a first determining unit that, according to the presence or absence of the metal detected by the metal detector, determines whether the document may be discarded in the document discarding portion; a second determining unit that, according to the code read by the code reader, determines whether the document may be discarded in the document discarding portion; and a document discarding control unit that, in a case where the instruction accept portion accepts an instruction to discard the document, on condition that the first determining unit and the second determining unit both determine that the document can be discarded in the document discarding portion, controls the document discarding portion to discard the document.

BRIEF DESCRIPTION OF THE DRAWINGS

Exemplary embodiment of the present invention will be described in detail based on the following figures, wherein:

FIG. 10 is an explanatory view of a document managing table;

DETAILED DESCRIPTION

Next, description will be given below of an embodiment according to the invention.

Figure 1:
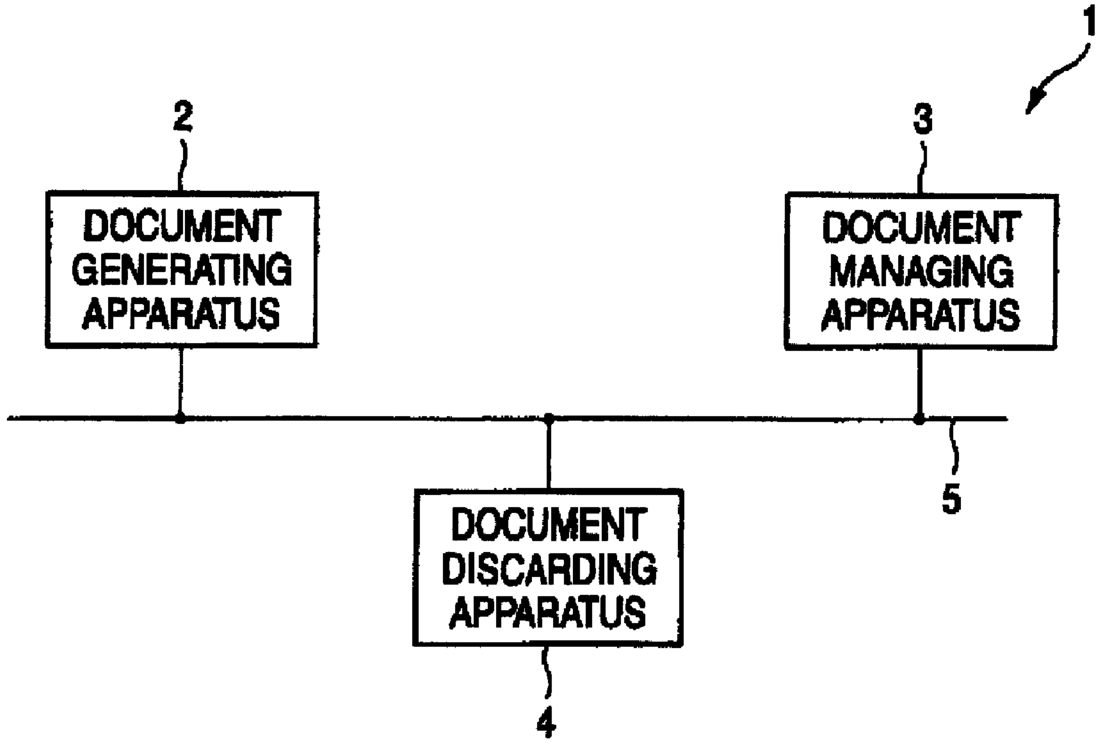
FIG. 1 is a block diagram of the whole structure of a document managing system according to an embodiment of the invention.

FIG. 1 is a block diagram of the whole structure of a document managing system according to the present embodiment. A document managing system 1 shown in FIG. 1 includes a document generating apparatus 2, a document managing apparatus 3 and a document discarding apparatus 4, which are connected together through a network 5 such as LAN (Local Area Network).

The document generating apparatus 2 is an apparatus which forms images on a printing medium such as paper to thereby generate a paper document. Here, the printing medium to be used in the paper document is not limited to paper but may be other material such as resin. And, the above-mentioned images may include code symbols such as bar codes which are generated by encoding a document ID serving as identification information for identifying the above paper document. The document managing apparatus 3 is an apparatus which carries out various managing processing on the paper document that is generated by the document generating apparatus 2. The document discarding apparatus 4 is an apparatus which is used to discard a paper document generated by the document generating apparatus 2 and other paper documents.

Figure 2:
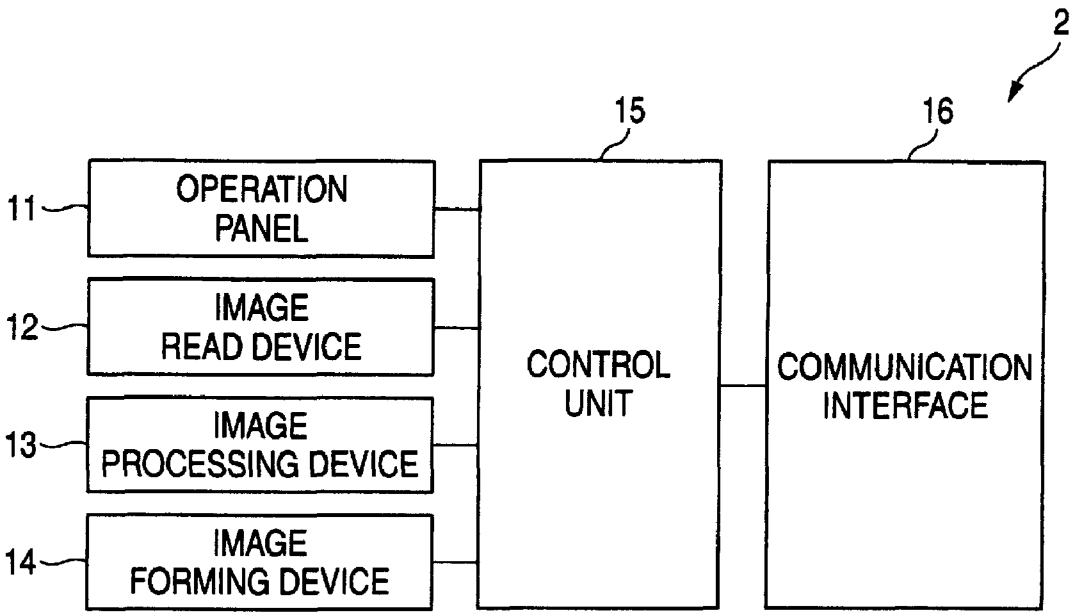
FIG. 2 is a block diagram of the structure of a document generating apparatus.

FIG. 2 is a block diagram of the structure of the document generating apparatus 2. The document generating apparatus 2 can be realized, for example, by a digital copying machine and a digital composite machine (a multi-function type copying machine). This document generating apparatus 2 includes an operation panel 11, an image read device 13, an image forming device 14, a control unit 15, and a communication interface 16.

The operation panel 11 provides an interface into which a user inputs various pieces of information and also on which there can be displayed various pieces of information for the user. The operation panel 11 includes, for example, an input portion having various buttons, switches, keys and the like, and a display portion composed of a liquid crystal display with a touch panel.

The image read device 12 is used to read optically the images of a manuscript which serve as objects to be read. This image read device 12 is a flat-bed scanner which radiates a light onto the surface of the manuscript set on a transparent manuscript stand (platen glass) and allows the reflected light reflected from the manuscript surface to form images on the light receiving surface of a read sensor (such as a CCD sensor) through an image forming system such as a mirror and a lens, thereby generating image data corresponding to the images of the manuscript.

The image processing device 13 is used to enforce given image processing (for example, a color change processing, a color correcting processing, a tone correcting processing, an expansion and contraction processing, an image rotation processing, and a screen generating processing) on the image data on the manuscript read by the image read device 12.

The image forming device 14 is used to print the image data read by the image read device 12 and image processed by the image processing device 13 onto a printing medium such as paper, and also to output the printed image data. This image forming device 14 prints the image data according to an electro-photographic method.

The control unit 15 controls various processing operations relating to the document generation. The document generation control portion of this control unit 15 includes a micro-computer and, according to various control programs, controls various processing operations which are executed by the operation panel 11, image read device 12, image processing device and image forming device 14.

The communication interface 16 is used when the document generating apparatus 2 sends and receives data to and from other apparatus (which includes the document managing apparatus 3 and document discarding apparatus 4) on the network 5. The data transmission and reception using the communication interface 16 are to be controlled by the control unit 15.

Figure 3:
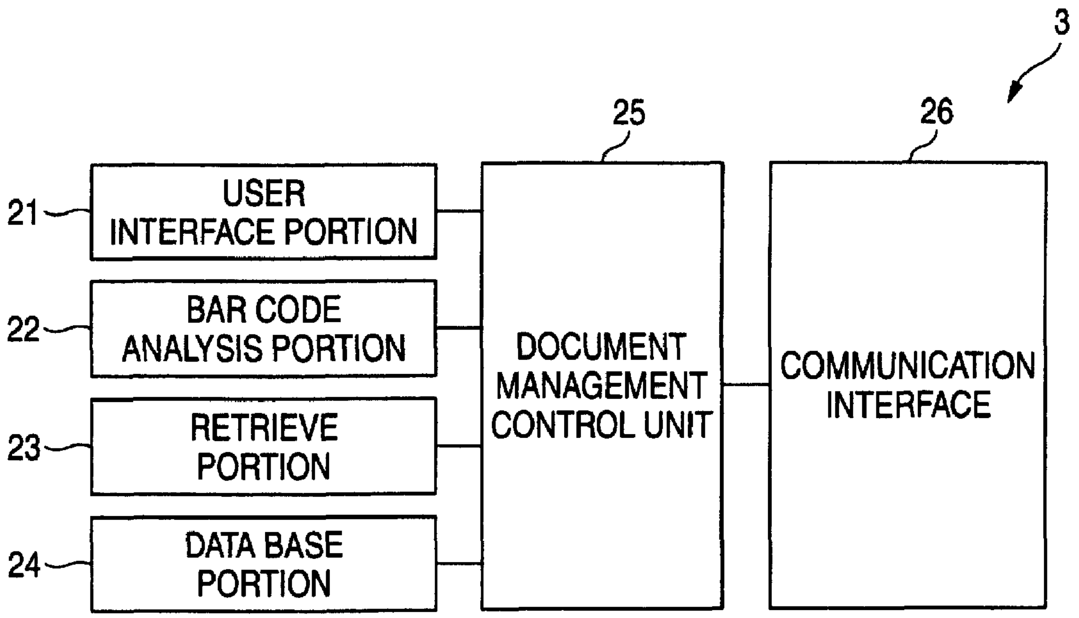
FIG. 3 is a function block diagram of the structure of a document managing apparatus.

FIG. 3 is a function block diagram of the structure of the document managing apparatus 3. The document managing apparatus 3 is structured using, for example, a personal computer; and, as the personal computer is operated according to various programs, the apparatus 3 carries out the following various processing. Th document managing apparatus 3 includes a user interface portion 21, a bar code analysis portion 22, a retrieve portion 23, a data base portion 24, a document management control portion 25 and a communication interface 26.

The user interface portion 21 is an interface into which a user using the document managing apparatus 3 inputs various pieces of information and also on which there can be displayed various pieces of information for the user. This user interface portion 21 includes, for example, an input device such as a keyboard and a mouse, and a display device such as a liquid crystal display.

The bar code analysis portion 22 is used to analyze and decode code symbols contained in the image data. The code symbols, which are analyzed by the bar code analysis portion 22, are code symbols that are contained in the paper document generated by the document generating apparatus 2. These code symbols such as bar codes are formed by encoding at least the above-mentioned document ID. Generally, a bar code is divided mainly to a one-dimensional bar code having information only in the one dimension direction, and a two-dimensional bar code having information in a two-dimensional direction. Both of them can be used. However, when you want to encode the document ID and other various pieces of information together into one bar code, preferably, you may use the two-dimensional bar code which is capable of encoding more data. In the following description, as an example of the code symbol, a bar code will be taken.

The retrieve portion 23 retrieves the data that are stored in the data base portion 24. The data base portion 24 provides a data base which is used to manage various paper documents. The data base portion 24 is a portion in which various data can be stored. The data base portion 24 can be formed, for example, in the interior of a hard disk device.

The document management control portion 25 is used to control various processing operations relating to the document management of the paper document. Th document management control portion 25 includes a micro computer; and, according to various control programs, the control portion 25 controls various processing operations which are carried out by the user interface portion 21, bar code analysis portion 22, retrieve portion 23 and data base portion 24.

The communication interface 26 is an interface through which the document managing apparatus 3 sends and receives data to and from other apparatus (including the document generating apparatus 2 and document discarding apparatus 4) on the network 5. The transmission and reception of data using the communication interface 26 are controlled by the document management control portion 25.

Figure 4:
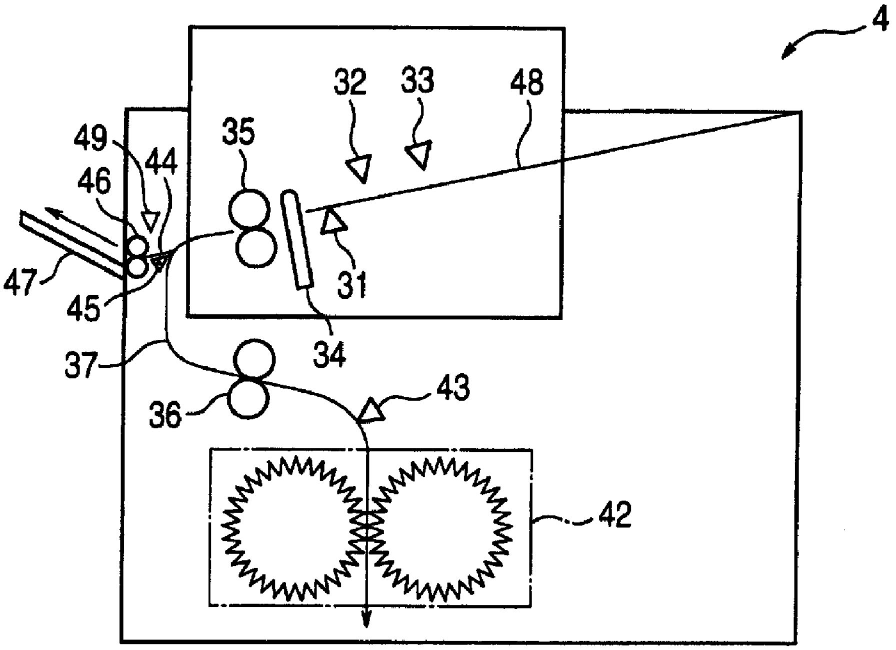
FIG. 4 is a schematic view to explain the mechanism of a document discarding apparatus of a manual insertion type.

FIG. 4 is a schematic explanatory view of the mechanism of the document discarding apparatus 4 of a manual feed type. This document discarding apparatus 4 may be, for example, a shredder.

A document tray 48 is a tray on which the paper document serving as an object to be discarded can be put. The document tray 48 is formed inclined obliquely relative to a horizontal plane so that it lowers gradually in position as it goes toward a stopper 34. The deep side (the low position side) of the document tray 48, together with an insert sensor 31, a bar code reader 32, a metal sensor 33, a stopper 34, and feed rollers 35, 36, is covered with a cover member 42.

The insert sensor 31 detects that the paper document has been inserted up to the given read position of the document tray 48. The insert sensor 31 is made of, for example, a reflection type of optical sensor including a light emitting element and a light receiving element. When a document exists at the sensing position of the insert sensor 31, the insert sensor 31 turns on; and, when not, it turns off.

The bar code reader 32 is used to read the bar code recorded portion of a paper document to be discarded and is structured in the following manner: that is, when an area sensor 16 provided therein receives through a lens the reflected light of the light radiated from a light source onto the bar code reading portion of the paper document to be discarded, the area sensor 16 can take therein the images of the bar codes of the paper document. Here, the bar code reading portion means a portion which is included in the surface of the document and in which the bar code is recorded; and, the position (area) of the bar code reading portion is previously regulated at a given position in the paper document.

The metal sensor 33 is a sensor used to detect the metal that is contained in the paper document to be discarded. The metal sensor 33 can detect the metal in the following manner. For example, a current is applied to a coil to thereby generate magnetic lines of force and, when the metal approaches the coil, the thus generated magnetic lines of force are influenced by the metal to cause the current flowing in the coil to vary. That is, by detecting such variations in the current, the metal sensor 33 can detect the metal. The metal sensor 33 may be preferably structured such that it can detect the metal at any position existing from the right end of the paper document to the left end thereof in a direction where the paper document is inserted into the document tray 48.

The stopper 34 has a long plate shaped structure or the like and is interposed between the insert sensor 31 and feed roller 35. The stopper 34 opens and closes a document feed passage 37, along which the paper document is fed by the feed rollers 35 and 36, in the entrance portion of the document feed passage 37. The stopper 34 can be driven in the vertical direction by a solenoid or other given actuator. In the closed state of the stopper 34, in order to be able to cut off the passage of the document extending from the document tray 48 to the feed roller 35, the stopper 34 is disposed in a state where it projects on such passage. Therefore, when the paper document put on the document tray 48 is inserted toward the deep or far side, the leading end of the paper document is butted against the stopper 34. On the other hand, in the open state of the stopper 34, in order to be able to retreat from the document passage extending from the document tray 48 to the feed roller 35, the stopper 34 is disposed in a state where it retreats from the document passage. Therefore, when the paper document put on the document tray 48 is inserted toward the deep or far side, the leading end of the paper document is butted against the nip portion of the feed roller 35.

Figure 5:
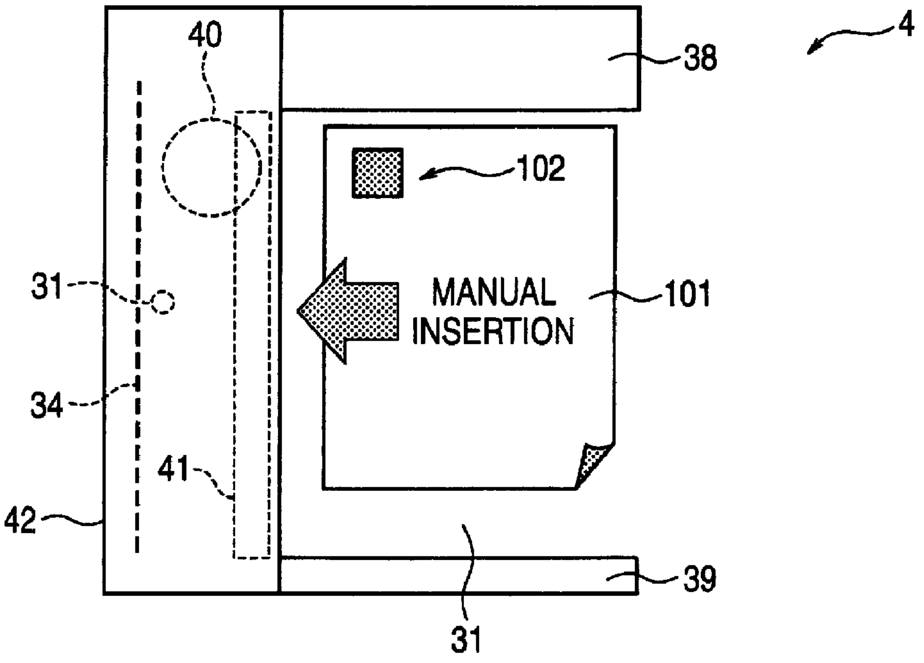
FIG. 5 is a plan view of the upper portion of the document discarding apparatus.

FIG. 5 is a plan view of the upper portion of the document tray 48. The document tray 48 includes insertion guides 38 and 39 on both sides in an insertion direction (in an arrow mark direction) when the paper document 101 is inserted by hand. The insertion guide 38 is provided in a fixed state, whereas the insertion guide 39 can be moved in the width direction of the document (in the vertical direction in FIG. 5) as the need arises. In this example, the paper document 101 to be discarded is inserted in the arrow mark direction of the document tray 48 in such a manner that a bar code recording portion 102 is arranged in the leading end side corner portion of the paper document 101. At the then time, in order to determine the position of the paper document 101 in a direction perpendicular to the inserting direction, one of the side ends of the paper document 101 is contacted with the guide surface of the insertion guide 38.

Owing to this, in a state where the leading end of the paper document 101 is butted against the stopper 34 by a user inserting the paper document 101 manually, a bar code recording portion 102 is positioned within a code reading area 40 provided by the bar code reader 32. Also, within a metal reading area 41 provided by the metal sensor 33, there is disposed the paper document 101 from the upper end to the lower end. In the document inserting direction, the insert sensor 31 is disposed in front of (just near to) the stopper 34. Therefore, when the leading end of the paper document 101 manually inserted by a user is butted against the stopper 34, the insert sensor 31 is switched from its off state to its on state just before it is butted against the stopper 34. Thus, a timing, at which the insert sensor 31 is turned on, shows a timing at which the bar code recording portion 102 is disposed within the code reading area 40.

Referring back again to FIG. 4, the feed roller 35 rotates while nipping (holding) a paper document inserted because the stopper 34 is opened, thereby feeding the paper document along a document feed passage 37. The document feed passage 37 includes a feed guide member (a chute or the like) which is not shown. The feed roller 36 rotates while nipping a paper document fed by the feed roller 35, thereby feeding the paper document along the document feed passage 37 to the shredder 42.

A pass sensor 43 is used to detect the pass of the paper document in the intermediate portion (almost at the middle point) of the document feed passage 37 extending from the feed roller 36 to the shredder 42. The pass sensor 43 is made of, for example, a reflecting type optical sensor including a light emitting element and a light receiving element. When a paper document exists at the sensing position of the pass sensor 43, the pass sensor 43 turns on; and, when not, it turns off. Therefore, simultaneously when the leading end of the paper document passes through the sensing position of the pass sensor 43, the pass sensor 43 is switched from its off state over to its on state and, after then, simultaneously when the trailing end of the paper document passes through the sensing position of the pass sensor 43, the pass sensor 43 is switched from its on state over to its off state.

The shredder 42 is an apparatus which, while pulling in a paper document fed therein by the feed roller 36 in one direction (in an arrow mark direction), shreds the paper document. This shredder 42 is also capable of shredding multiple paper documents (for example, a bundle of 20 sheets of A-4 size ordinary paper) all at once. And, the shredder 42 is further capable of shredding even a document, which has been staple processed using staples, as it is (in a state where the staples are not removed therefrom).

Another document feed passage 44 diverges from the document feed passage 37 at the middle position between the feed rollers 35 and 36. When a switching pawl 45, which can be driven by a given actuator, is rotated, a paper document being fed by the feed roller 35 can be fed to the document feed passage 37, or can be fed to the document feed passage 44. The paper document fed to the document feed passage 44 is discharged by a feed roller 46 to a paper discharge tray 47 which is disposed outside the box body of the document discarding apparatus 4.

A pass sensor 49 detects the pass off a paper document in the intermediate of the document feed passage 37 extending from the feed roller 35 to the paper discharge tray 47 (in front of a feed roller 46). The pass sensor 49 is made of, for example, a reflecting type optical sensor including a light emitting element and a light receiving element. When a paper document exists at the sensing position of the pass sensor 49, the pass sensor 49 turns on; and, when not, it turns off. Therefore, simultaneously when the leading end of a paper document passes through the sensing position of the pass sensor 49, the pass sensor 49 is switched from its off state over to its on state. After then, simultaneously when the trailing end of a paper document passes through the sensing position of the pass sensor 49, the pass sensor 49 is switched from its on state over to its off state.

Figure 6:
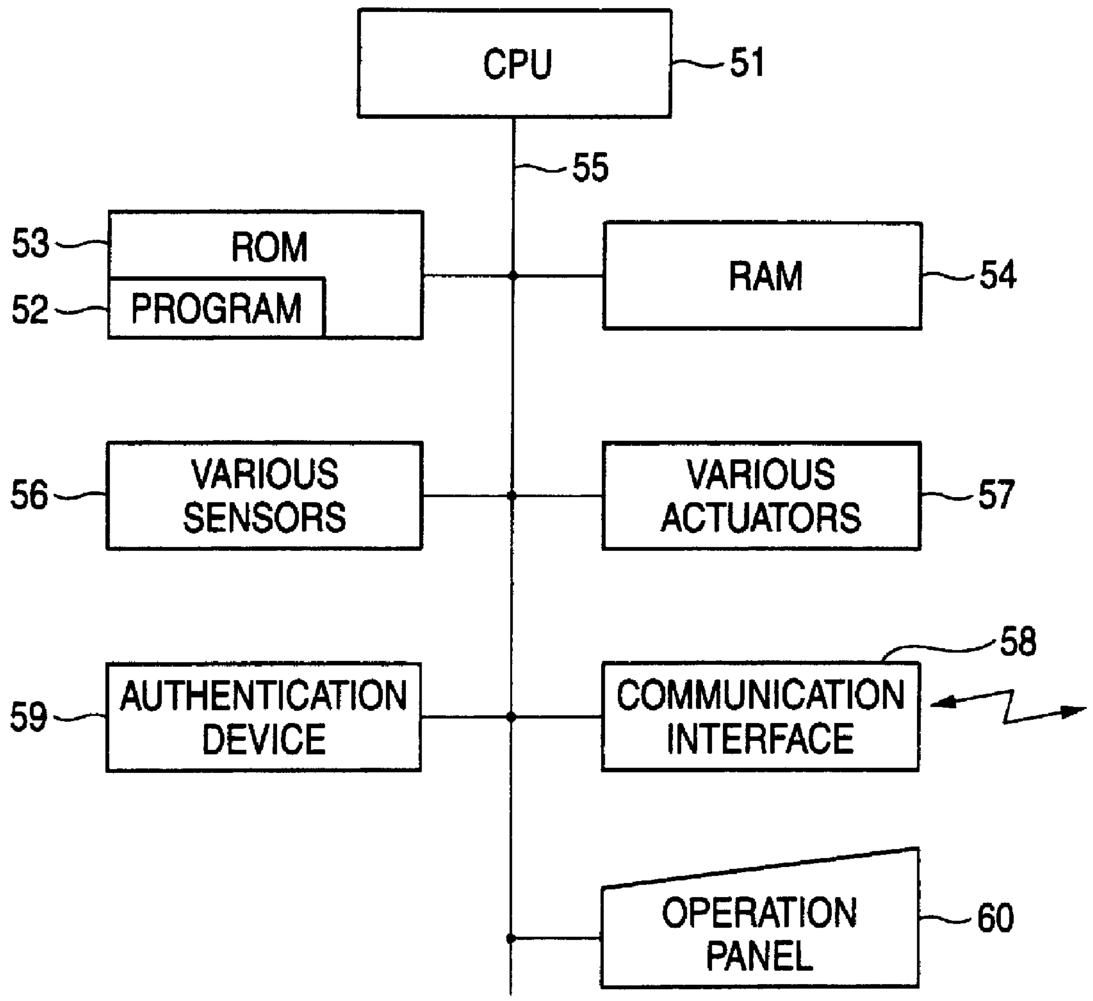
FIG. 6 is a block diagram to show the electrical connection of the document discarding apparatus.

FIG. 6 is a block diagram of the electric connection of the document discarding apparatus 4. The document discarding apparatus 4, which carries out various operations, includes a CPU 51 for controlling the respective portions of the apparatus 4 collectively, a ROM 53 storing therein a control program 52 to be carried out by the CPU 51, and a RAM 54 serving as the operating area of the CPU 51, which are connected together through a bus 55. To the bus 55, through a given interface, there are connected various sensors 56 (here, for convenience's sake, various sensors 56 include the insert sensor 31, bar code reader 33, metal sensor 33 and the like which are used in the document discarding apparatus 4), various actuators 57 (here, for convenience's sake, various actuators 57 include various solenoids and motors for driving the stopper 34, feed rollers 35, 36 and the like), a communication interface 58 for communicating with the document managing apparatus 3 and the like through the network 5, an authentication device 59 for authenticating a user, and an operation panel 60 including various operation keys and a display for displaying a message thereon.

The CPU 51 carries out the following processing according to the control program 52. Here, the control program 52 may also be stored initially in the ROM 53, or the control program 52 stored in a storing medium such as an optical disk or a magneto-optical disk may be read by a given read device and may be then set up in a nonvolatile memory or a magnetic memory device. Or, the control program 52 may be down loaded from a given server device in the form of carrier waves and may be then set up in a nonvolatile memory or a magnetic memory device.

The authentication device 59 is a device which authenticates the user of the document discarding apparatus 4 as to whether the user is a manager having the authorization to discard the paper document or not. When it is requested to input a password as such user authentication, the authentication device 59 includes an input device having an input key. When it is requested to read the ID card as the user authentication, the authentication device 59 includes a card reader. Further, when there is requested biological authentication such as fingerprint authentication, palm venous authentication and iris authentication as the user authentication, the authentication device 59 includes a read device which reads a portion of a living body such as a fingerprint, a palm and an iris. Here, the pass word or the biological information necessary for authentication may also be previously registered in the document managing apparatus 3 and, as the need arises, it may be inquired from the document discarding apparatus 4; or, an operation to check the password or biological information itself may also be carried out by the document managing apparatus 3.

Next, description will be given below of a processing to be carried out by the document managing system 1.

Figure 7:
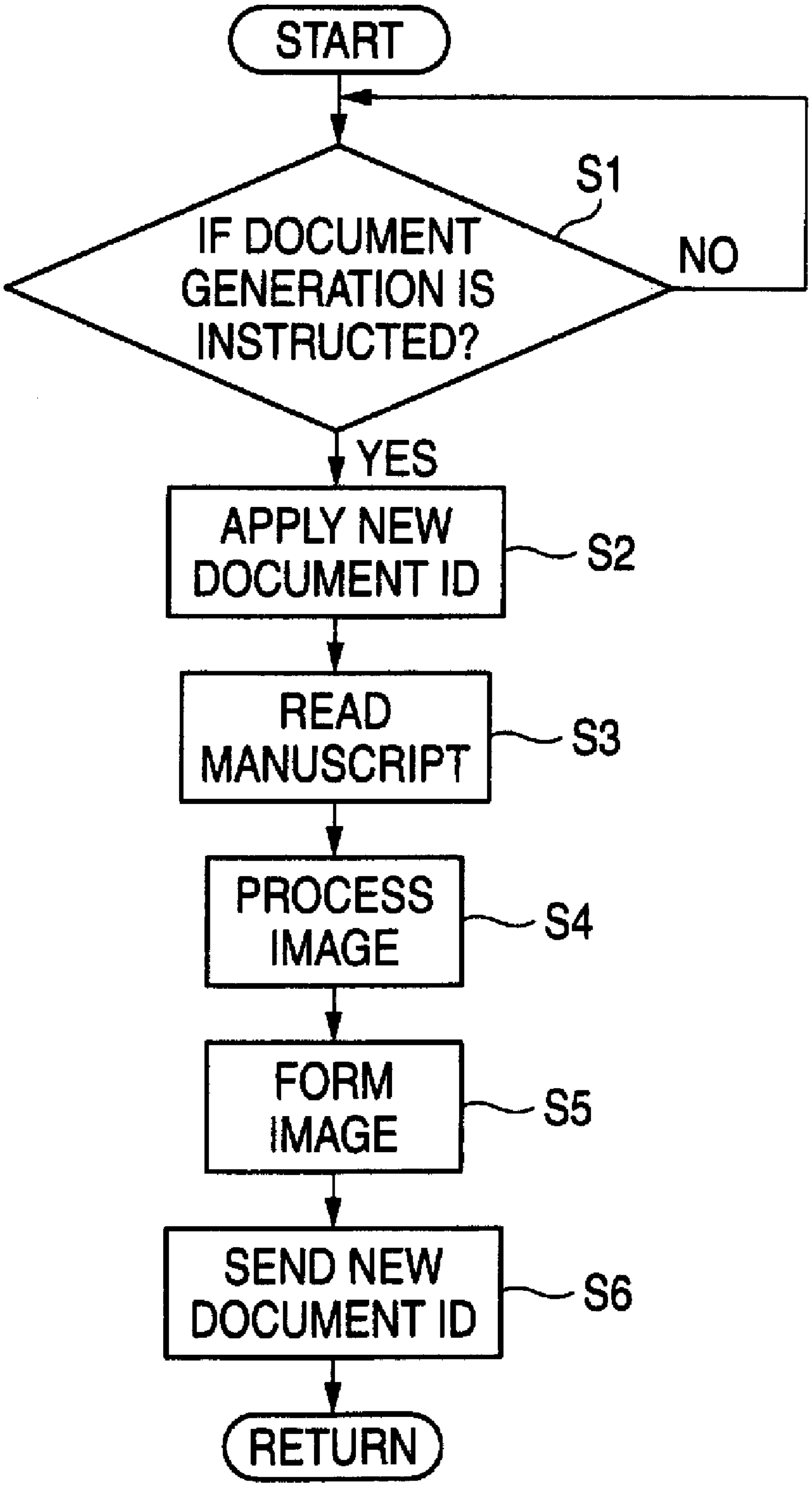
FIG. 7 is a flow chart to explain a processing to be executed by the document generating apparatus.

FIG. 7 is a flow chart to explain a processing to be carried out by the document generating apparatus 2. When the creation of a new paper document is instructed by operating the operation panel 11 (Y in Step S1), the document generating apparatus 2 requires the document managing apparatus 3 to provide a new document ID and accepts the new document ID (Step S2). And, the document generating apparatus 2 reads a manuscript set in the image read device 12 (Step S3), and allows the image processing device 13 to carry out a given image processing such as a color changing processing or a color correcting processing (Step S4). At the then time, the image processing device 13 reads the image of a bar code, which is formed by encoding the document ID accepted in Step S2, and adds the thus-read image to a given position of the image data of the manuscript. And, the image forming device 14 forms an image (Step S5), whereby there is generated a paper document. Thus, at a given position in the thus generated paper document, there is displayed the image of the bar code which is the encoded version of the document ID. And, the new document ID is sent to the document managing apparatus 3 (Step S6).

Figure 8:
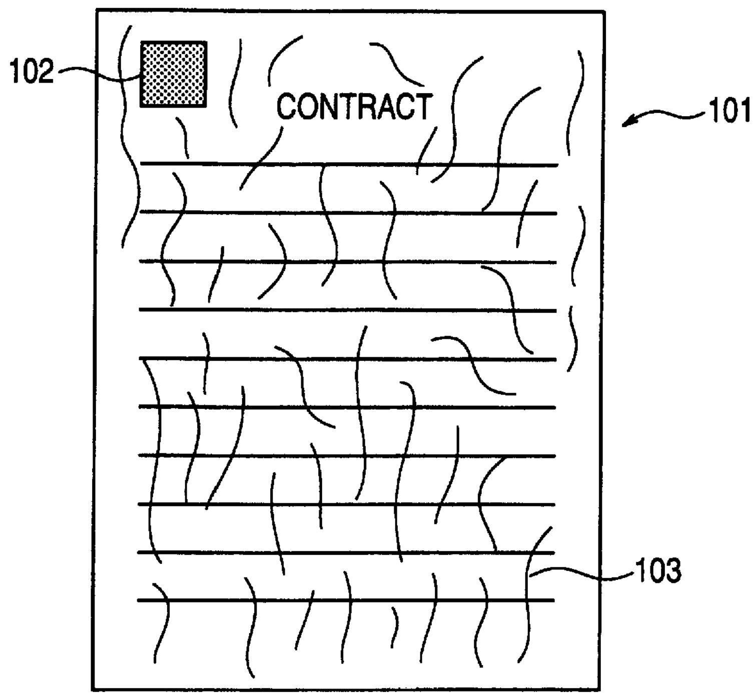
FIG. 8 is a plan view of an example of a paper document.

FIG. 8 is a plan view of a first example of the thus generated paper document 101. In this example, in the left upward margin of the paper document 101, there is displayed a bar code 102. This bar code 102 is applied as described above. A very thin metal-made wire 103 is embedded into the paper of the paper document 101 over the entire areas of the paper.

Figure 9:
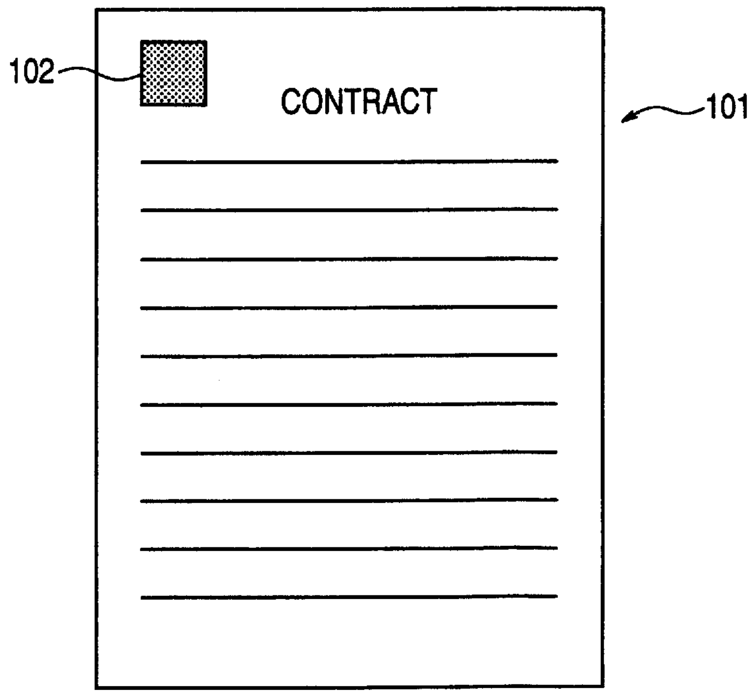
FIG. 9 is a plan view of another example of a paper document.

FIG. 9 is a plan view of a second example of the same paper document 101. The paper document 101 shown in FIG. 9 is different from the paper document 101 shown in FIG. 8 in that the wire 103 is not embedded therein.

That is, for the paper to be used as a printing medium in the document managing apparatus 3, there are prepared two kinds of paper, into one of which there is embedded the wire 103 and into the other of which there is not embedded the wire 103; and, these two kinds of paper are used properly according to cases. In other words, when the paper document 101 is a document which is highly confidential and thus must be discarded sooner or later by the document discarding apparatus 4, there is used the paper with the wire 103 embedded therein; and, when the paper document 101 is a document which is low in confidentiality and thus may not be discarded by the document discarding apparatus 4, there is used the paper with the wire 103 not embedded therein. Since the two kinds of paper are used properly in order to distinguish whether the paper document 101 is to be discarded finally or not, when the paper document 101 is a document to be discarded in the end by the document discarding apparatus 4, there may also be used the paper with the wire 103 not embedded therein; and, the paper document 101 is a document which need not be discarded by the document discarding apparatus 4, there may also be used the paper with the wire 103 embedded therein.

FIG. 10 is an explanatory view of a document managing data base 61 which is registered in the data base portion 24 of the document managing apparatus 3. The document managing data base 61 is a data base which is used to manage the whole of a document life cycle extending from an initial stage for generation of a paper document to a final stage for discarding of the paper document. In the document managing data base 61, there are registered the document ID 62 of a paper document, the date of generation of the paper document 63, the pro and con of carry-out of the paper document 64, the discardable date of the paper document 65, the discarding data of the paper document 66, the discarder of the paper document 67, and the like.

"Con" in "pro and con about carry-out of the paper document 64" means that the paper document is a highly confidential document and is prohibited from being carried out of a room equipped with the document managing system 1. Since this document is a confidential document, it must be discarded in the end by the document discarding apparatus 4 to thereby prevent the leakage of the information contained in the document. "Pro" in "pro and con about carry-out of the paper document 64" means that the paper document is low in confidentiality and thus may be carried out of the room equipped with the document managing system 1. That is, since the need to prevent the leakage of the information contained in this document is low, this is the paper document that may not be discarded by the document discarding apparatus 4. As regards the discardable date of the paper document 65, when "con" is registered in "pro and con about carry-out of the paper document 64, there is registered the date when the paper document can be discarded. For example, for some of the paper documents, there is specified a storage obligation time by a law, which can tell the time at and from when the paper document can be discarded after passage of the storage obligation time. Thus, the discardable date of the paper document 65 can be registered.

Figure 11:
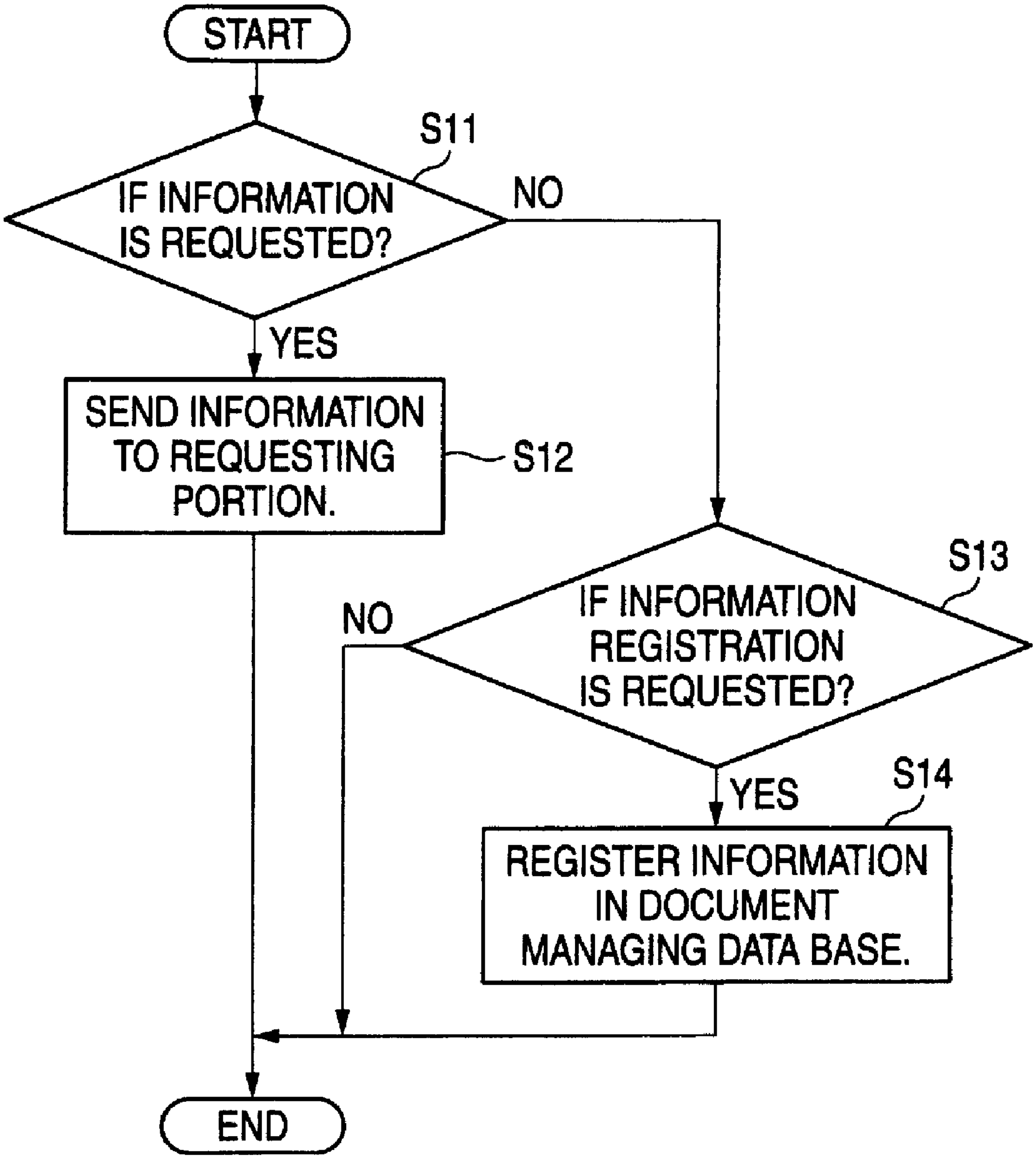
FIG. 11 is a flow chart to explain a processing to be executed by the document managing apparatus.

FIG. 11 is a flow chart of a processing to be carried out by the document managing apparatus 3. When the document managing apparatus 3 receives a request from a user through the user interface 21 or a request from the document generating apparatus 2 and document discarding apparatus 4 (Y in Step S11), it sends information corresponding to such request to the user or the apparatus (Step S12). When the document managing apparatus 3 receives a request for registration of information into the document managing data base 61 or the like (Y in Step S13), it registers the requested information into the document managing data base 61 or the like (Step S14).

Figure 12:
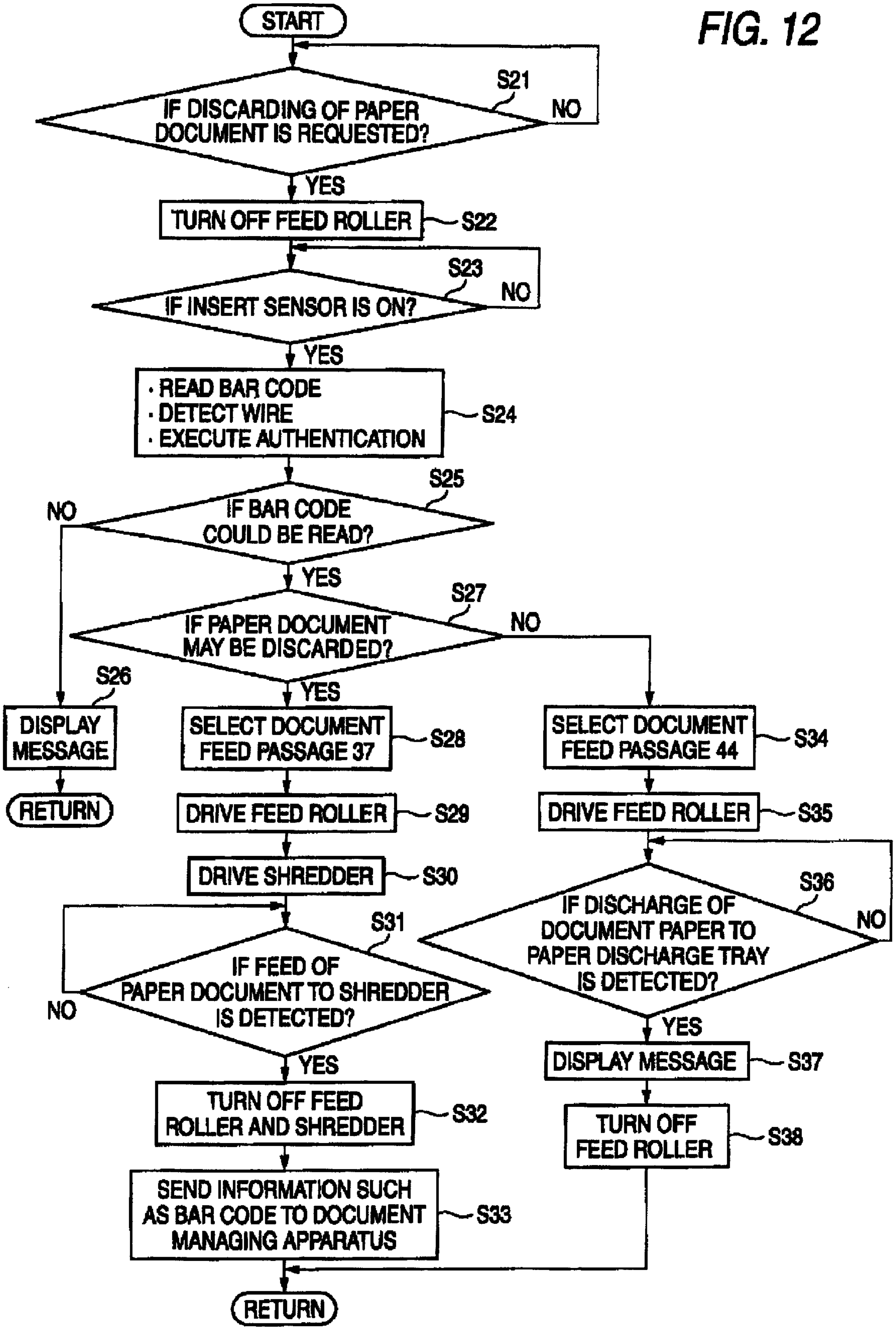
FIG. 12 is a flow chart to explain a processing to be executed the document discarding apparatus.

FIG. 12 is a flow chart of a processing to be executed by the document discarding apparatus 4. Firstly, when the document discarding apparatus 4 receives a request for discarding of a paper document through the operation of the operation panel 60 (Y in Step S21), it turns off the feed rollers 35, 36 (Step S22), and checks whether the insert sensor 31 is on or not and a paper document is inserted into the document tray 48 or not (Step S23). When the insert sensor 31 is on and the paper document is inserted into the document tray 48 (Y in Step S23), the bar code reader 32 reads the bar code 102, the metal sensor 33 detects the wire 103, and the authentication device 59 authenticates whether the user is a manager or the like having the authorization to discard the paper document using the document discarding apparatus 4 or not (Step S24). Here, the authentication processing, as described above, may be carried out by the document discarding apparatus 4 while inquiring the document managing apparatus 3 of the authentication data. And, the authentication data check itself may also be carried out by the document managing apparatus 3.

When the bar code reader 32 cannot read the bar code 102 (N in Step S25), on the display of the operation panel 60, there is displayed a message telling that the bar code 102 cannot be read, thereby informing the user of this state (Step S26).

When the bar code reader 32 can read the bar code 102 (Y in Step S25), it is determined whether the paper document is to be discarded or not according to the following results: that is, information obtained by decoding the bar code 102 using the bar code reader 32; the presence or absence of the wire 103 when detected by the metal sensor 33; and, the result of determination of the user made by the authentication device 59 whether the user has the authorization to discard the paper document using the document discarding apparatus 4 or not (the specific examples of this determination will be discussed later) (Step S27).

When it is determined that the paper document is discarded (Y in Step S27), the switching pawl 45 is driven to select the document feed passage 37 (Step S28), the feed rollers 35 and 36 are driven (Step S29), and the shredder 42 is driven (Step S30). The paper document in the document tray 48 is fed toward the shredder 42, and is shredded and discarded by the shredder 42. And, when the pass sensor 43 is switched from its off state to its on state and is next switched from the on state to the off state, it is detected that the paper document has been fed to the shredder 42 (Y in Step S31); and, when the execution of the discarding of the paper document is confirmed, the driving of the feed rollers 35, 36 and shredder 42 is turned off (Step S32). And, the bar code 102 read by the bar code reader 32 and information such as authentication information or the like obtained in Step S24 are sent to the document managing apparatus 3 (Step S33). Thus, the document managing apparatus 3 specifies the document ID of the discarded document, while referring to the document managing data base 61, registers the date when the paper document was discarded in the discarded date 66 in relation to the document ID 61, and registers in the discarder 67 the name of a manager who discarded the document.

On the other hand, when it is determined that the paper document is not discarded (N in Step S27), the switching pawl 45 is driven to select the document feed passage 44 (Step S34), and the feed rollers 35 and 46 are driven (Step S35). In this manner, the paper document is discharged into the paper discharge tray 47. The pass sensor 49 is switched from the off state to the on state and is then switched from the on state to the off state, whereby, when it is detected that the paper document has been fed to the paper discharge tray 47 (Y in Step S36), on the display of the operation panel 60, there is displayed a message telling that the discarding of the paper document is not permitted, informing the user of this state (Step S37). Also, the information, which tells that the prohibited trial of the paper document discarding has been made, may be informed through the network 4 to a terminal device owned by a system manager or the like. And, the driving of the feed rollers 35 and 46 is turned off (Step S38).

Next, description will be given of the determination whether the paper document is to be carried out or not (Step S27). Here, there are carried out the following determinations (1) to (4).

(1) By detecting whether the paper document includes the wire 103 or not, it is determined whether the paper document is a highly confidential paper document to be discarded in the end (when the wire 103 is detected) or a paper document which is low in confidentiality and may not be discarded (when the wire 103 is detected).

(2) The bar code 102 read is decoded to specify the document ID 62, the document managing apparatus 3 is inquired of the pro and con about carry-out 64 of the paper document and the discardable date 65 of the paper document corresponding to the document ID 62 and registered in the document managing data base 61, it is checked from these data whether the paper document is to be discarded or not. That is, when the pro and con about carry-out 64 is pro, it is determined that the paper document is low in confidentiality and need not be discarded but can be carried out of the security room. When the pro and con about carry-out 64 is con, it is determined that the paper document is highly confidential and must not be carried out and also that it must be discarded in the end. When the pro and con of carry-out 64 is con, since the date when the discarding of the paper document can be discarded is recorded in the discarding allowable date 65, when the current time has reached this date, the paper document may be discarded. However, when the current time has reached this date, the paper document must not be discarded yet but must be stored. This determination may be carried out in such a manner that the document ID 62 is sent to the document managing apparatus 3, the document managing apparatus 3 is allowed to carry out the necessary processing, and the result of the processing is sent back. Or, while allowing the document managing apparatus 3 to send the data on the pro and con of carry-out 64 and the discarding allowable date corresponding to the document ID 62 to the document discarding apparatus 4, the determination may be carried out by the document discarding apparatus 4.

(3) The authentication device 59 determines whether a user trying to discard the paper document is a manager having the authorization to discard a paper document or not. This determination may also be carried out by the document discarding apparatus 4, or may also be carried out in such a manner that a password, biological information or the like input by the authentication device 59 is sent to the document managing apparatus 3 and the result obtained by the document managing apparatus is sent back to the authentication device 59.

(4) And, when all of the above determinations (1) to (3) show that the paper document may be discarded, it is determined that the discarding of the paper document is to be carried out (Y in Step S27). On the other hand, when any one of the determinations (1) to (3) shows that the paper document is not to be discarded, it is determined that the discarding of the paper document is not to be carried out (N in Step S27).

Description will be further given below of specific examples.

When the (1) determination shows from the detection of presence or absence of the wire 103 that the paper document must not be discarded, the paper document must not be discarded regardless of the determinations in (2) and (3).

Even when the (1) determination shows from the detection of presence or absence of the wire 103 that the paper document may be discarded, if the pro and con of carry-out is pro in the determination (2), the paper document must not be discarded.

Even when the (1) determination shows from the detection of presence or absence of the wire 103 that the paper document may be discarded, if the pro and con of carry-out is con in the (2) determination and the time has not reached the discardable date, the paper document must not be discarded.

Even when the (1) determination shows from the detection of presence or absence of the wire 103 that the paper document may be discarded, the pro and con of carry-out is con in the (2) determination and the time has reached the discardable date, if the (3) determination shows that the paper document must not be discarded, the paper document must not be discarded.

Only when the (1) determination shows from the detection of presence or absence of the wire 103 that the paper document may be discarded, the pro and con of carry-out is con in the (2) determination, the time has reached the discardable date, and the (3) determination shows that the paper document may be discarded, the paper document is to be discarded.

As described above, according to the bar code 102 of a paper document, it can be determined that the paper document is a paper document to be discarded or not. Also, according to the detection of the presence or absence of the wire 103, it can be determined that the paper document is a paper document to be discarded or not. As regards the bar code 102 of a paper document, if only the bar code 102 portion of the paper document is cut away from the paper document, it can be removed easily; and, after then, if another bar code 102 is applied to the paper document by adhesion or the like to disguise the paper document, even the paper document not to be discarded can be discarded. On the other hand, since the wire 103 can be initially embedded into a paper document over the entire areas of the paper thereof, even when a portion of the paper document is removed from the paper document, it can be accurately determined that the paper document is to be discarded or not; and thus, a paper document not to be discarded cannot be disguised in such a manner that it can be discarded. Also, since the wire 103 is contained in the paper document, if a metal detector is provided at the exit of a room for managing the paper document, it is possible to check the illegal carry-out of the paper document.

However, the use of only the wire 103 is simply able to determine that a paper document may be discarded or not. On the other hand, in the case of the bar code 102 of a paper document, the above-mentioned document ID 62 of the paper document and other various pieces of information can be encoded, thereby being able to closely check from various information whether the paper document may be discarded or not.

In the above-mentioned example, using various information such as the pro and con of carry-out 64 and discardable data 65 respectively related to the document ID 62, it is checked whether a paper document may be discarded or not. However, this is not limitative but, for example, various information may be registered into the document data base 61 while it is related to the document ID or may be encoded into the bar code 102, whereby to discard a paper document or not to discard it can be closely checked according to such various information.

Further, according to the above example, since the present document discarding apparatus can authenticate whether a person trying to discard a paper document is a manager or the like having the authorization to discard a paper document, it is possible to prevent a person not having the authorization to discard a paper document from discarding the paper document.

Here, in the above-mentioned example, the document discarding apparatus 4 is connected to the network 5. However, the document discarding apparatus 4 may not be connected to the network 5. In this case, the document discarding apparatus 4 may include a storage device for storing therein information on the document ID 62 read before discarded from a paper document which is discarded, and a communication interface for reading data from the storage device.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document discarding apparatus comprising:

a metal detector that detects presence or absence of a metal embedded in a document recorded on a printing medium;

a code reader that reads a code obtained by encoding information and displayed on the document;

an instruction accept portion that accepts an instruction to discard the document;

a document discarding portion that discards the document;

a first determining unit that, according to the presence or absence of the metal detected by the metal detector, determines whether the document may be discarded in the document discarding portion;

a second determining unit that, according to the code read by the code reader, determines whether the document may be discarded in the document discarding portion; and a document discarding control unit that, in a case where the instruction accept portion accepts an instruction to discard the document, on condition that the first determining unit and the second determining unit both determine that the document can be discarded in the document discarding portion, controls the document discarding portion to discard the document.

2. The document discarding apparatus as claimed in claim 1, further comprising an authentication unit that authenticates whether a person giving an instruction to discard the document according to the instruction accept portion has an authorization to discard the document in the document discarding portion, wherein the document discarding control unit, in a case where the instruction accept portion accepts the instruction to discard the document, controls the document discarding portion to discard the document on condition that the first determining unit and the second determining unit both determine that the document can be discarded in the document discarding portion as well as the authentication unit authenticates that the person giving the instruction to discard the document according to the instruction accept portion has the authorization to discard the document in the document discarding portion.

3. The document discarding apparatus as claimed in claim 2, further comprising an informing unit that informs that the document can not be discarded, in a case where any one of the first determining unit and the second determining unit determines that the document can not be discarded in the document discarding portion, or in a case where the authentication unit determines that a person giving an instruction to discard the document according to the instruction accept portion has no authorization to discard the document in the document discarding portion.

4. The document discarding apparatus as claimed in claim 1, wherein the second determining unit, according to the code read by the code reader, determines whether the document can be carried out, determines a nondiscardable period of the document in a case where the document is found not to be carried out, and, on condition that the document is found not to be carried out and a time has passed the nondiscardable period, determines that the document can be discarded in the document discarding portion.

* * * * *